United States Patent
Strait et al.

(10) Patent No.: US 6,364,304 B1
(45) Date of Patent: Apr. 2, 2002

(54) FLY TYING VISE

(76) Inventors: David S. Strait, 1223 Centerville Hwy., Lyle, WA (US) 98635; Arlan W. Way, 1405 Manor Dr., Gladstone, OR (US) 97027

( * ) Notice: Subject to any disclaimer, the term of this patent is extended or adjusted under 35 U.S.C. 154(b) by 0 days.

(21) Appl. No.: 09/502,996

(22) Filed: Feb. 11, 2000

Related U.S. Application Data (60) Provisional application No. 60/120,225, filed on Feb. 15, 1999.

(51) Int. Cl.[7] .................................................. B25B 3/00
(52) U.S. Cl. .......................... 269/71; 269/97; 269/69; 269/907; 269/131; 43/1
(58) Field of Search .......................... 269/3, 4, 45, 236, 269/907, 76, 71; 43/1

(56) References Cited

U.S. PATENT DOCUMENTS

| | | |
|---|---|---|
| 989,794 A | 4/1911 | Mueller |
| 2,120,571 A | 6/1938 | Reichenstein et al. |
| 2,236,781 A | 4/1941 | Pannier |
| 2,486,142 A | 10/1949 | Fong |
| 2,489,547 A | 11/1949 | Temple |
| 2,569,424 A | 9/1951 | Mayhew et al. |
| 2,586,636 A | 2/1952 | Fischer et al. |
| 2,734,299 A | 2/1956 | Masson |
| 3,060,613 A | 10/1962 | Murray |
| 3,588,078 A | 6/1971 | Van De Sande |
| 3,909,969 A | 10/1975 | Finch |
| 3,945,631 A * | 3/1976 | Sander ........................ 269/131 |
| 4,094,497 A * | 6/1978 | Stratton ....................... 269/71 |
| 4,169,562 A | 10/1979 | Renzetti |
| 4,322,065 A * | 3/1982 | Doiron ................... 269/254 R |
| 4,969,636 A * | 11/1990 | Gautan ........................ 269/71 |
| 5,165,673 A * | 11/1992 | Newton ........................... 43/1 |
| 5,775,679 A * | 7/1998 | Strub .......................... 269/75 |
| 6,119,972 A * | 9/2000 | Vogel ......................... 242/448 |

* cited by examiner

Primary Examiner—Derris H. Banks
Assistant Examiner—Daniel Shanley
(74) Attorney, Agent, or Firm—Dellett and Walters (57) ABSTRACT

A fly tying vise provides a three point engagement with a hook by use of an anvil having an aperture therein. An elongate engagement member slides inwardly and outwardly relative to the aperture, and includes a slot therein for receiving a portion of the hook therethrough. Translation of the engagement member controls the degree of engagement of the hook by the vise. The vise support post is curved away from the user to provide room for the user's hands during use.

32 Claims, 7 Drawing Sheets

FLY TYING VISE

This application claims benefit of Provisional Application No. 60/120,225 filed Feb. 15, 1999.

BACKGROUND OF THE INVENTION

This invention relates to fishing equipment and more particularly to a vise for tying fishing flies.

When tying fishing flies, typically, a vise is employed to hold the hook while feathers, tinsel or the like are tied to the hook to create an artificial fly that simulates the appearance of a natural fly in order to attract a fish. Also, some artificial flies are created that do not specifically imitate any natural insect, but still accomplish the desired purpose of attracting a fish.

In accordance with the prior art, fly tying vises are provided with two jaw members or two split anvil members, typically metal, that are compressed together to clamp onto a fishing hook placed therebetween. The hook is held by the compressed anvil members while the fly is tied. A major problem with a design of this type is that it depends upon the coefficient of friction of the anvil members and the hook (typically hard steel against hard steel, which is 0.78 under ideal conditions). If the hook is not held sufficiently well, it will move while being tied, which is undesirable. The fly tier must therefore apply a great deal of force to ensure that the hook is tightly clamped. This leads to a great deal of frustration for the fly tier with the vise and can result in rapid wear of the vise, requiring maintenance or replacement.

Depending on the particular design of the artificial fly, material or thread may be desired to be tied down along a significant portion of the lower "bend" region of the fishing hook. Since with the anvil type vises, the lower bend portion is where the anvil members typically engage the hook, it becomes difficult to make such flies. In an attempt to resolve some of these issues, U.S. Pat. No. 3,945,631 employs a band that loops over the top of an anvil and over the body of the hook, whereby when the band is pulled downwardly, the hook is trapped in a slot in the anvil. However, this design only engages the hook with the anvil at the point where the band crosses over the hook body. If smaller size hooks are used, there is a greater likelihood that the hook can move or rotate within the vise. Also, as the anvil slot wears through use, the likelihood of such rotation or movement increases.

Many people who tie flies like to be able to take their fly tying projects with them when fishing or traveling. However, many fly tying vises are not compact and do not break down to an easily transportable configuration. Further, many vises have a limited mounting clamp mouth size, making it impossible to mount the vise to a relatively thick table, such as a picnic table or a trade show table. As such, it can be necessary to carry a separate mounting board that is clamped to the thick table with, for example, large C-clamps. Then, the fly tying vise is clamped to the separate mounting board. While this compromise is functional, such a situation unnecessarily increases the amount of items that must be packed around when fly tying on the road.

SUMMARY OF THE INVENTION

In accordance with the invention, a fly tying vise is provided with an extensible eye bolt having a hook receiving slot therein. A hook is passed through the slot, and the eye bolt is retracted to secure the hook against the top of the slot and the anvil of the clamping mechanism. A three-point engagement with the hook is thus provided, for securing the hook against movement, while enabling access to a large portion of the hook bend without interference by the vise.

Accordingly, it is an object of the present invention to provide an improved fly tying vise.

It is a further object of the present invention to provide an improved fly tying vise that accommodates a range of hook sizes.

It is yet another object of the present invention to provide an improved fly tying vise that engages the hook while blocking access to only a minimal portion of the body of the hook.

Still another object of the present invention is to provide an improved fly tying vise with a vertical mounting post design that is less likely to be in the way of the fly tier's hands during use.

A further object of the present invention is to provide an improved fly tying vise that engages the hook at 3 points thereon.

Yet a further object of the present invention is to provide an improved fly tying vise that securely engages a variety of hook sizes.

Another object of the present invention is to provide an improved mounting structure for a fly tying vise that will accommodate a variety of mounting situations.

Still a further object of the present invention is to provide an improved fly tying vise that securely engages a variety of hook sizes, while enabling the hook shank center line to be substantially aligned with a rotational axis of the vise.

An additional object of the present invention to provide an improved fly tying vise that accommodates both left and right handed users.

A further object of the present invention to provide an improved fly tying vise that quickly disassembles for storage and transport.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

Figure 1:
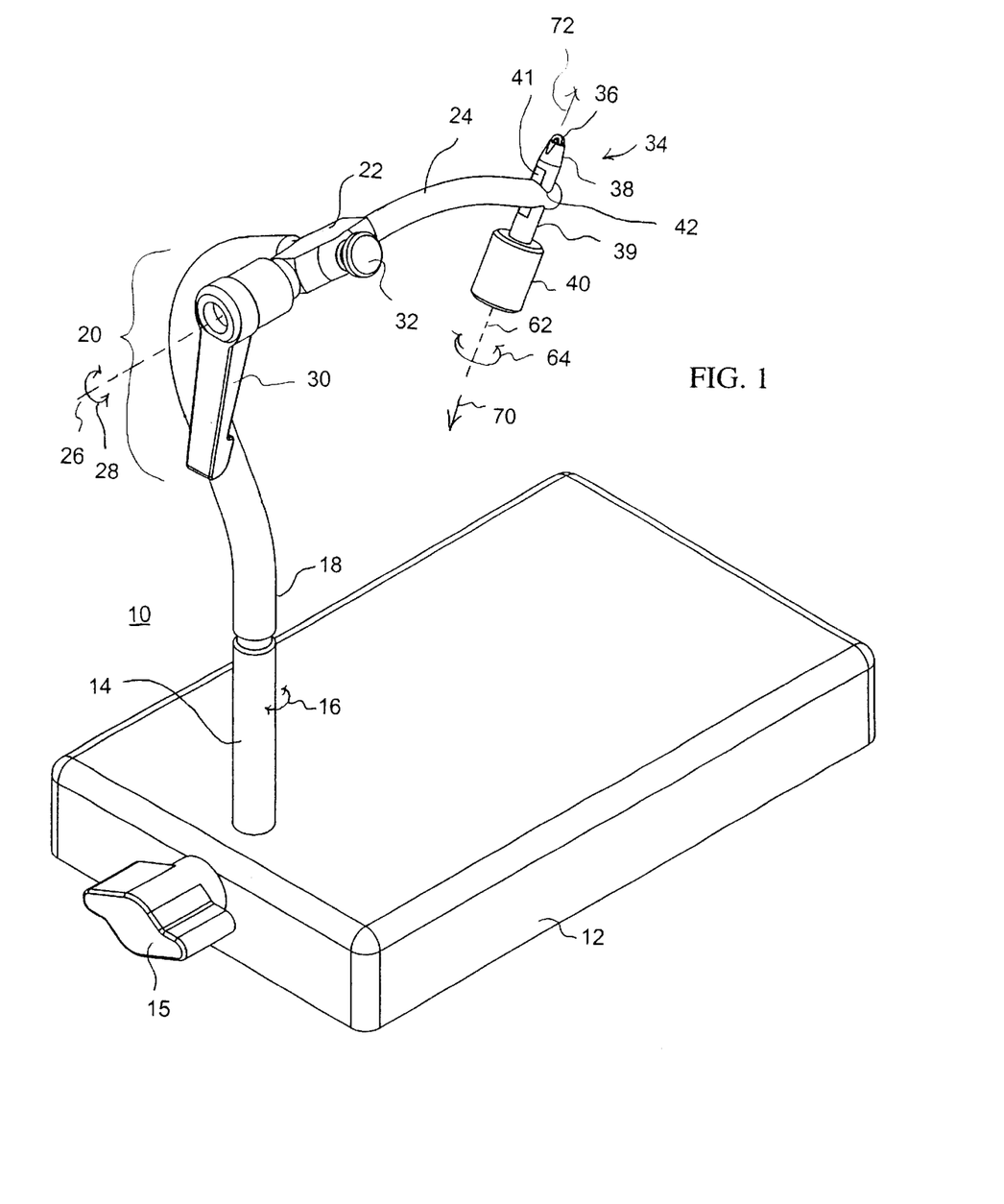
FIG. 1 is a perspective view of a fly tying vise in accordance with the present invention.
Figure 2:
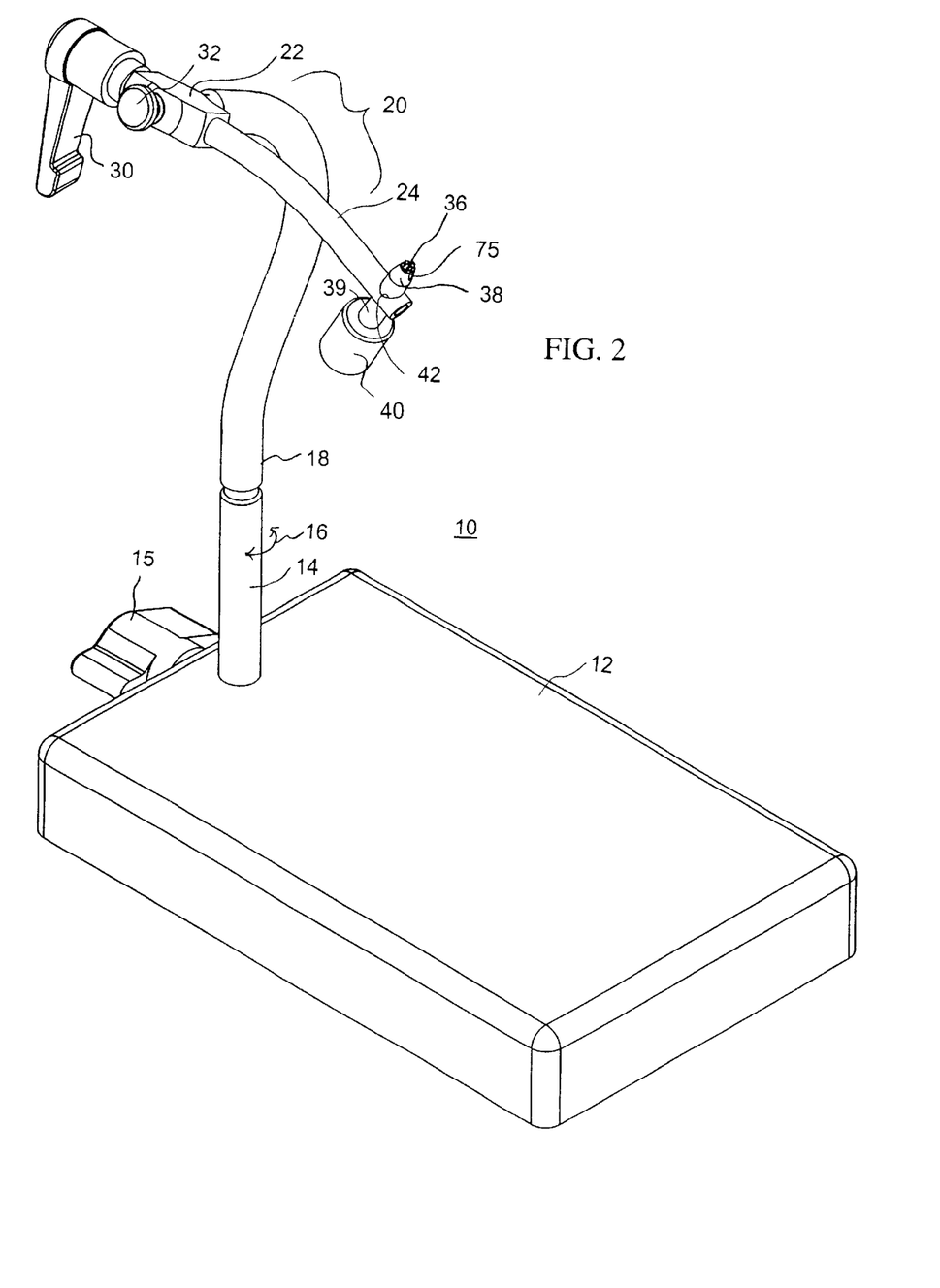
FIG. 2 is another perspective view of the fly tying vise of FIG. 1, taken from a different direction.

The system according to a preferred embodiment of the present invention comprises an improved fly tying vise. Referring to FIG. 1 and FIG. 2, perspective views of the fly tying vise 10, a base 12 may be provided with a base post 14 therein. (Alternatively the vise may be clamped to a table or the like as discussed hereinbelow in connection with FIGS. 8–10.) The post is removably held within an opening in the base, by way of tightening adjustment member 15 (suitably threadably engaged with the base 12). By loosening the adjustment member, the post can be rotated as illustrated by arc 16, to adjust the overall positioning of the vise relative to the base. A curved mounting post 18 connects to base post 14 and extends upwardly from the base, and includes a curved portion 20 that extends generally away from the viewer and then back towards the viewer in FIG. 1, as the point of reference continues upwardly along the extent of post 18. The curved portion 20 is concave from the point of view in FIG. 1, and is visible in greater detail in FIG. 3. Referring still to FIG. 1, at the top end of mounting post 18, a vise arm receiving member 22 is attached to the mounting post, and carries vise arm 24 therein, in rotational arrangement whereby arm 24 can be rotated around axis 26 as illustrated by arc 28. On a first side of member 22, a rotation arm 30 is held at one end of vise arm 24. Friction adjusting member 32 is provided on arm receiving member 22, to enable adjustment of the degree of friction on the vise arm against rotation as described hereinbelow. Vise arm 24 extends a distance away from receiving member 22 on the side opposite rotation arm 30, and suitably curves slightly downwardly. Vise arm 24 carries clamping head 34 at the most distal portion of the arm.

Clamping head 34 comprises a hook receiving portion 36 mounted within an anvil 38. A tightening control 40 is provided, the above-mentioned items being mounted to the end of vise arm 24 via mounting hole 42 which extends through the arm. The anvil 38 extends downwardly via a shaft portion 39 carrying a flat segment 41 along a midregion thereof. In the preferred embodiment, the central portion of shaft is substantially cylindrical, other than the flat segment thereon, and mounting hole 42 is correspondingly circular in cross-section. The hook receiving portion further carries an elongated slot 44 therein (more fully visible in FIG. 6) through which a hook is passed for engagement by the vise.

Base 12 is suitably made of a relatively heavy substance, such as metal, to provide a sufficiently stable mounting base that will not travel around or easily tip over during use of the vise.

In operation, a hook is clamped by the clamping head, as described hereinbelow, to secure the hook so the fly tier can work on the hook with the hook held firmly in position. While the hook is held, the arm 24 can be rotated about axis 26 by turning arm 30 about the same axis. Once the arm is rotated to a preferred position, it may be secured, if desired, at that orientation by turning friction adjuster 32 to adjust the rotational resistance of the arm, so as the fly tier wraps thread, feathers and the like about the hook, the arm will not undesirably rotate. As friction adjuster 32 is turned (suitably it is in threaded engagement with the portion of arm receiving member 22 in which it sits), it presses a bearing member 46 (not visible) against arm 24, to lock the arm against rotation.

Figure 4:
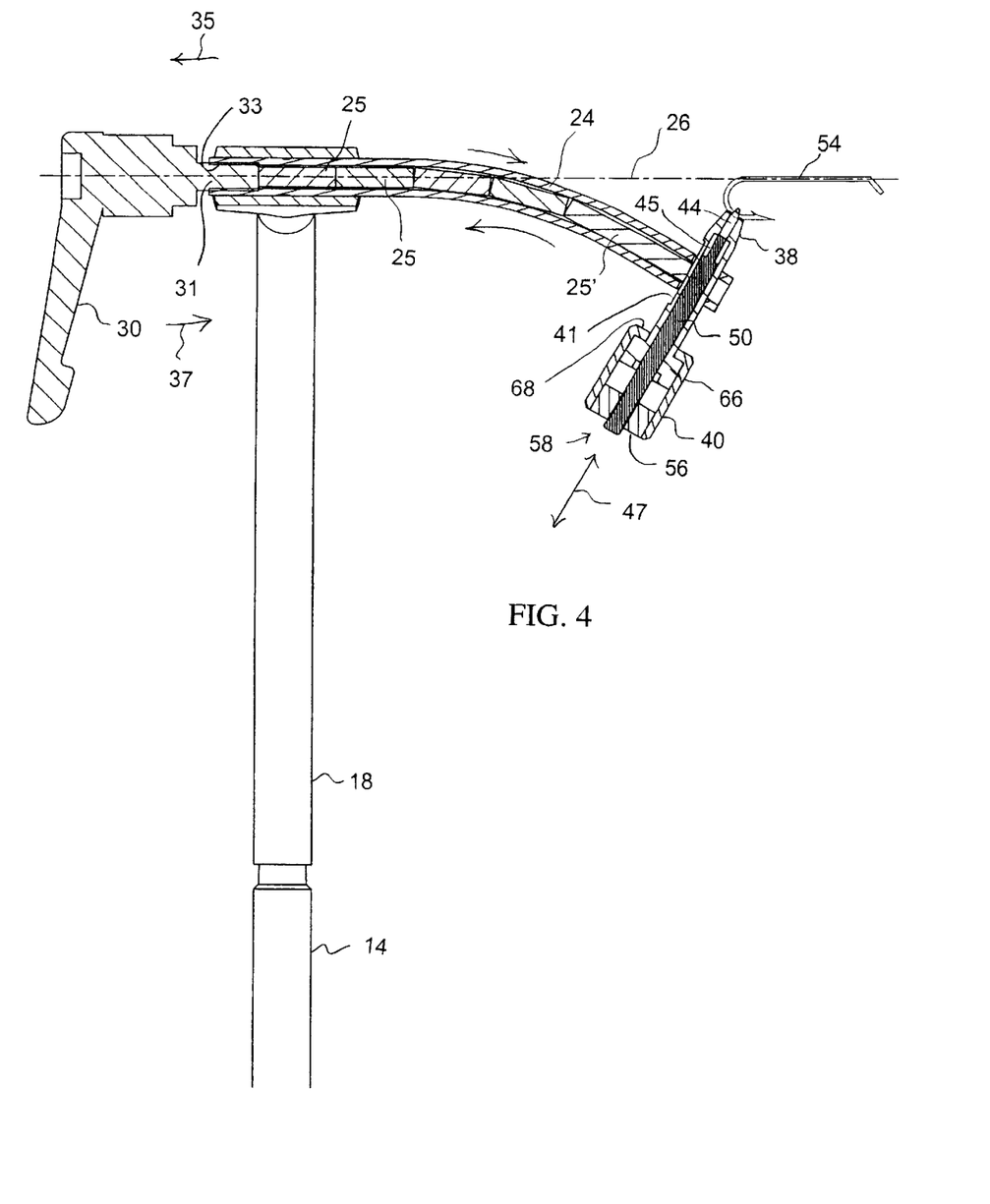
FIG. 4 is a partial sectional view of the upper portions of the vise according to the present invention.
Figures 5, 6, 7:
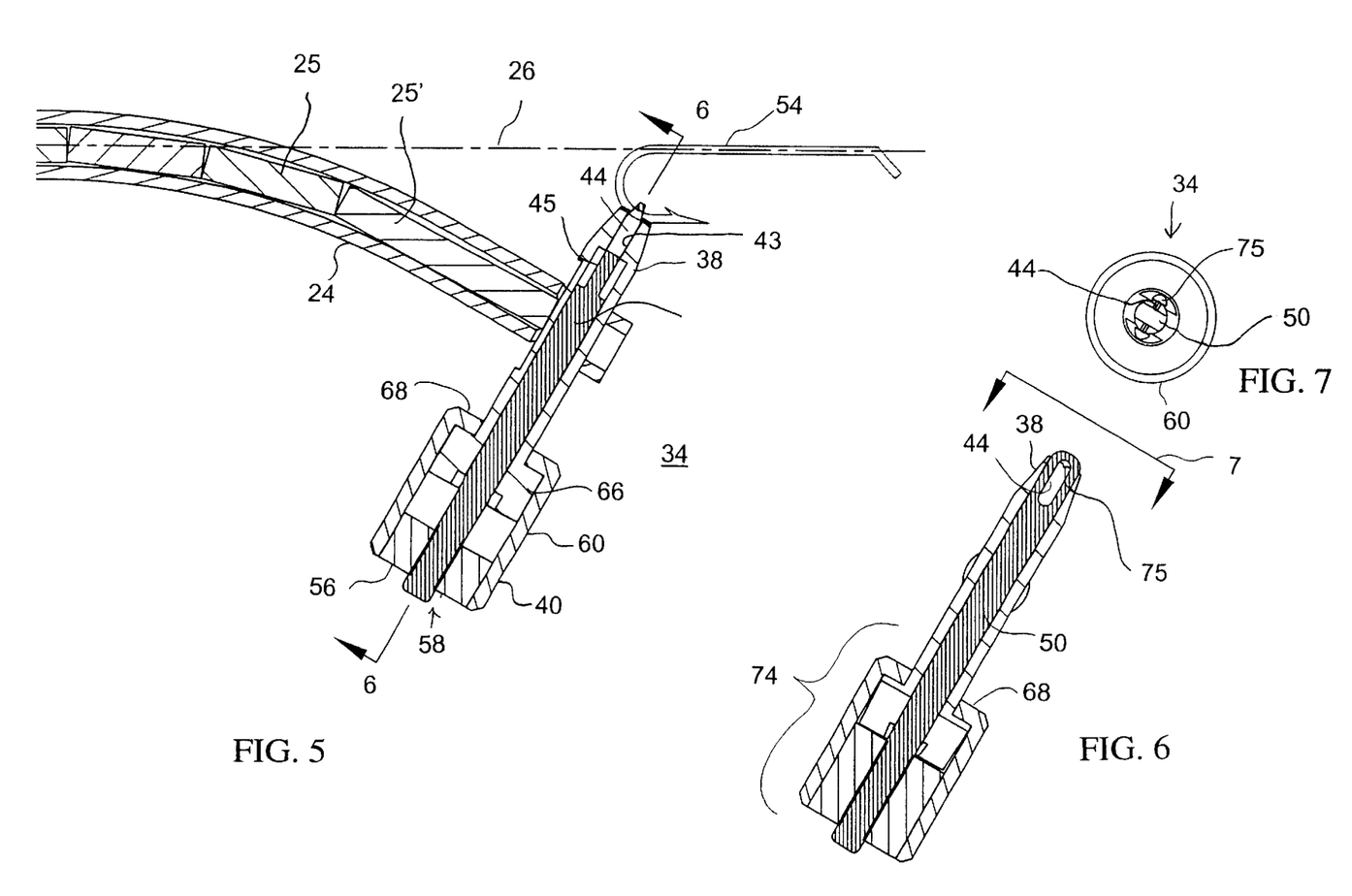
FIG. 5 is an enlarged view of the distal portion of the vise arm and the securing elements of the vise.
FIG. 6 is a partial sectional view of the securing elements of the vise as viewed along line 6—6 of FIG. 5.
FIG. 7 is an end view of the securing portion of FIG. 6

Referring now to FIG. 4, a sectional view of the upper portions of the vise with a hook mounted therein, together with FIG. 5, an enlarged view of the clamping head end of the vise arm, the interior of arm 24 is suitably hollow, and carries plural push rod segment members 25 therewithin, in end-to-end engagement with one another. An end member 31 of rotation arm 30 extends into the interior of arm 24, suitably being threadably engaged therewith via cooperating threads 33. The end member 31 is in contact with an end of the push rod segment 25 nearest thereto. The push rod segment 25' most distal from arm 30 is in contact with flat segment 41.

The clamping head includes an anvil portion 38 with a tapered end portion and a central bore extending therethrough, for receiving an elongate eye bolt member 50 therethrough. In the preferred embodiment of the inventions, the last portion 43 of the bore at the hook receiving end is slotted to prevent the eyebolt from turning. As can be observed in FIG. 5, a correspondingly shaped portion 45 is provided on the upper end of the eye bolt so as to cooperatively fit within the slotted portion of the anvil, to discourage rotation of the eye bolt as the thumb screw 60 is turned. The upper end of the eye bolt has hook receiving opening 44 defined therein, through which fish hook 54 is allowed to pass. The eye bolt extends substantially the length of the clamping head 34, and is threadably engaged with a nut 56 at end 58 distal from opening 44. A thumb screw 60 is secured to the nut 56, together making up the tightening control 40. The thumb screw and nut are freely rotatable around the body of anvil 38 in the arc indicated by reference 64 along axis 62 (see FIG. 1). Still referring to FIG. 5, thumb screw 60 is maintained in relation to the lower end of the anvil body by the cooperation of the flared portions 66 of the anvil body and flanges 68 in the thumb screw body that fit over the flared portions.

Referring to FIG. 5 and FIG. 1 together, in operation, a fish hook 54 is positioned to pass a portion of the hook through the hook receiving opening 44, whereupon thumb screw 60 is rotated. The nut 56 thereby turns, and the threaded engagement between the nut and the eye bolt 50 results in the eye bolt pulling downwardly in the direction of arrow 70 of FIG. 1. Accordingly, the opening 44 in the eye bolt pulls downwardly, securing the hook between the anvil and the upper end of the eye bolt (i.e. the top of opening 44). A secure three point engagement of the hook is thus provided (two points comprising the engagement with left and right anvil portions, and the third point comprising the engagement of the hook with the portion of the eye bolt at the top of opening 44). Once tying operations are complete, then the thumb screw can be rotated in the opposite direction, which allows the eye bolt to move upwardly (arrow 72, FIG. 1), so the hook is released.

FIG. 6 is a cross sectional view of the clamping head 34, taken along line 6—6 of FIG. 5, wherein the configuration of the elongate opening 44 in the eye bolt is shown. The portion of the eye bolt that is typically threaded is indicated at 74 in FIG. 6. Also visible in FIG. 6 is a notched portion 75 defined in the end of anvil 38. The notch is suitably defined along a line portion across the top of the anvil, thereby providing notch portions on two opposing edges of the top of the anvil. The notch defines a seat region within which the hook sits when engaged by the region within which the hook sits when engaged by the vise, suitably providing enhanced holding of the hook.

FIG. 7 is an end view of the clamping head 34 only (as removed from the rest of the vise) viewed in the direction of arrows 7 of FIG. 6.

Referring again to FIGS. 4 and 5, the cooperation of handle 30 and its end member 31, and the threaded engagement 33 to the arm portion 24 provides an operational advantage to the vise. By holding arm 24 stationary, and rotating handle 30 counter clockwise, member 31 is moved in the direction of arrow 35 (FIG. 4), releasing any pressure against the push rod segment members 25 and 25'. Thus, the pressing engagement of segment member 25' against flat segment portion 41 of shaft 39 is relaxed, releasing the shaft for movement upwardly or downwardly along the axis of arrow 47 (FIG. 4). This upwardly or downwardly movement, enables adjustment of the position of the hook 54 as clamped in the vise, so that the longitudinal centerline of the shank of the hook can be aligned to the rotation axis 26. With the hook so aligned, handle 30 is then rotated clockwise, which, by operation of the threaded engagement, causes member 31 to move inwardly in the direction of arrow 37, pushing against the push rod members 25. Push rod member 25' then pushes against flat segment 41, which clamps the shaft 39 in position along axis 47. Now, while tying a fly, the user is able to rotate the arm 24 about axis 26, and the alignment of the hook shank to that axis keeps the hook from rotating in an eccentric manner.

While the vise as illustrated will accommodate a large range of hook sizes, different heads having varied sizes of anvils, eye bolt portions and openings 44 may be provided to accommodate both relatively large and relatively small hooks.

The vertically oriented curved mounting post 18 provides an advantage with its curved opening portion that curves away from the fly tier. By having the curved area in the post, clearance is provided for the fly tier's hand during use. The vise mounting post is therefore much less likely to be in the way of the tier as contrasted with vises of the prior art.

Figure 3:
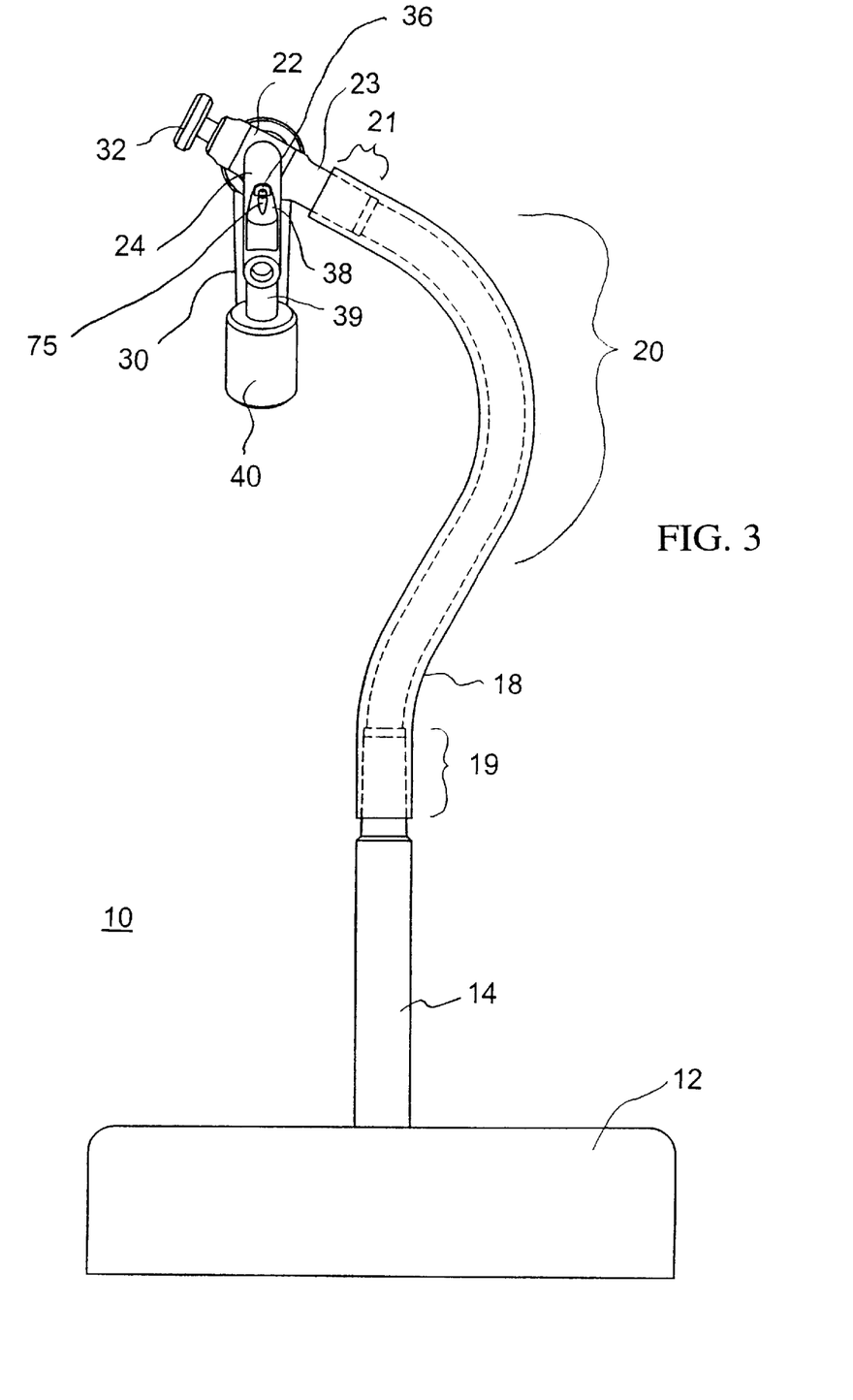
FIG. 3 is a side view of the fly tying vise illustrating the profile of the mounting post thereof.

Referring to FIG. 3, a side view of the fly tying vise illustrating the profile of the mounting post, it may be observed that the curved mounting post 18 is removably engaged with base post 14 by way of tapered region 19. This region comprises a taper on the upper portion of post 14, and a corresponding mating taper on the interior of the lower portion of post 18. The corresponding tapers enable the two portions to be pushed together to a tight engagement, while still enabling easy disassembly for storage or transport of the vise. Also, the arm receiving portion 22 carries a mounting post 23 thereon, which is received into the upper end of curved mounting post 18. Both the mounting post 23 and the interior of curved mounting post 18 are tapered in region 21, the corresponding tapers suitably allowing quick assembly or disassembly, while still providing a secure engagement between the mating parts when the vise is in use. By use of the tapered engagement, the vise is easily broken down to constituent pieces which can be easily packed in a small space for storage or transport. Further, the configuration enables the vise to be used by left or right handed tiers.

While the illustrated embodiment employs a thumb screw and threaded elongate eye bolt for tightening and loosening, other configurations are possible. For example, a cammed lever can be provided wherein movement of the lever translates to downward or upward movement of the eye bolt. Also, the vise can be constructed such that the anvil portion moves and the eye through bolt remains stationary relative thereto.

Figure 8:
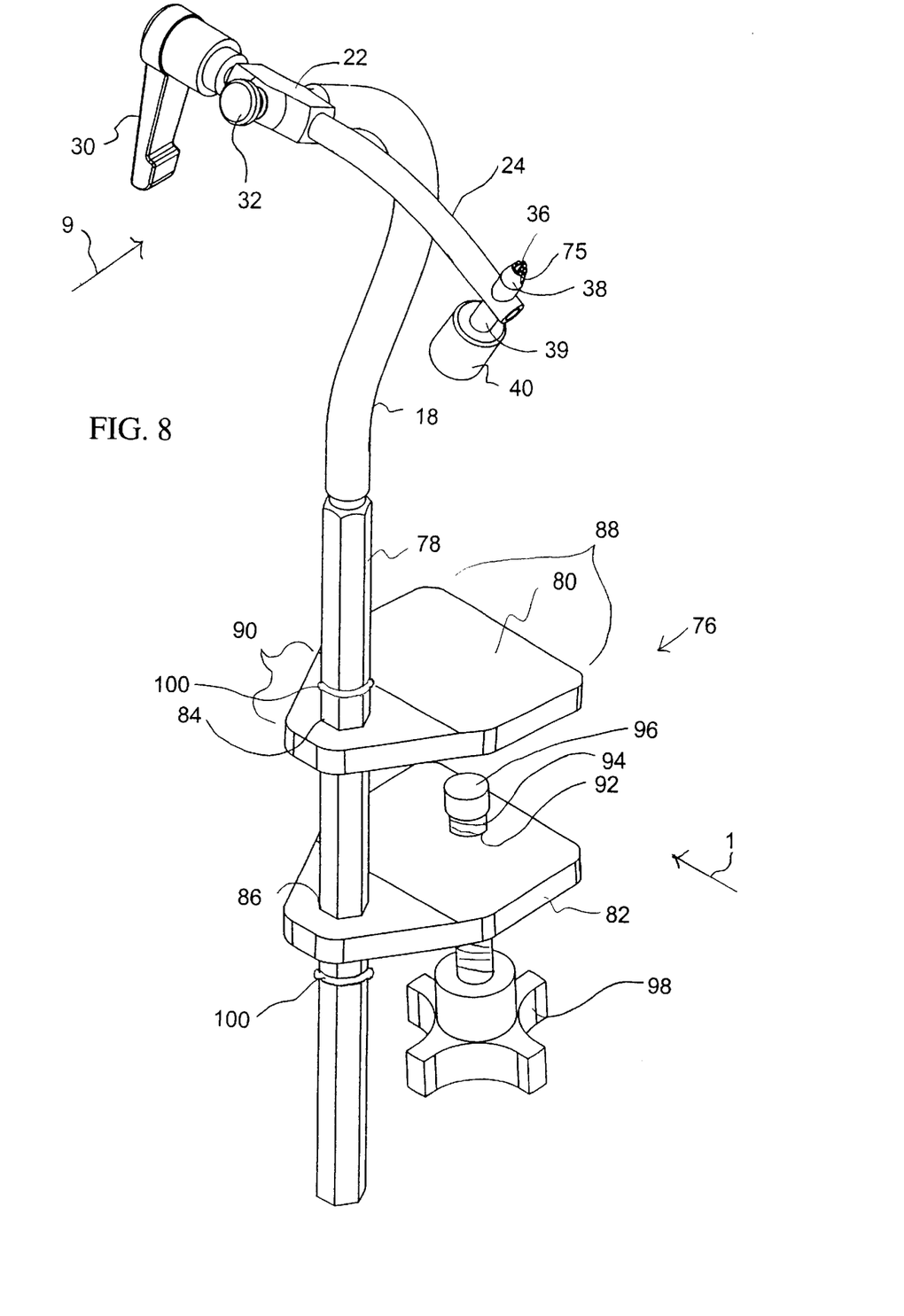
FIG. 8 is a perspective view of an embodiment fly tying vise in accordance with the present invention, employing a clamping mechanism.
Figure 9:
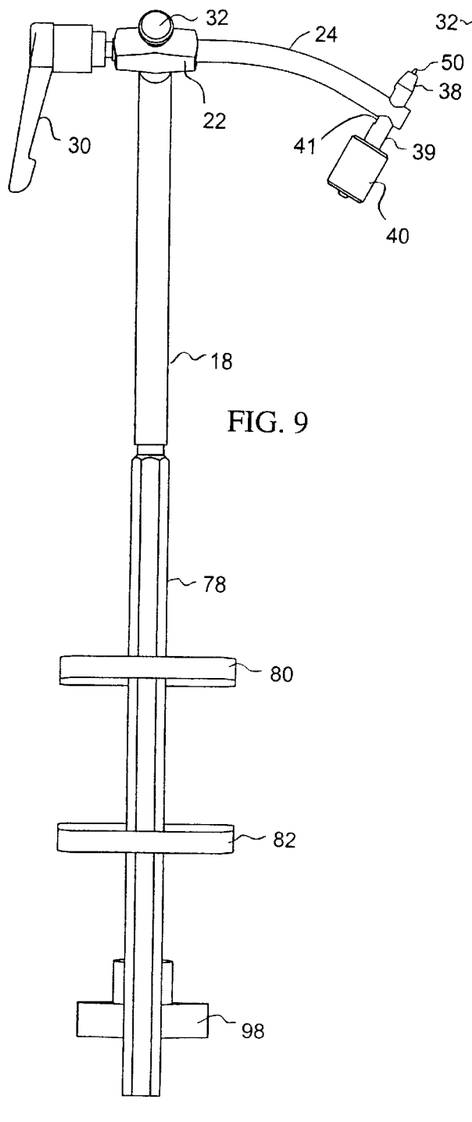
FIG. 9 is a side view of the embodiment of FIG. 8, taken in the direction of arrow 9 on FIG. 8.
Figure 10:
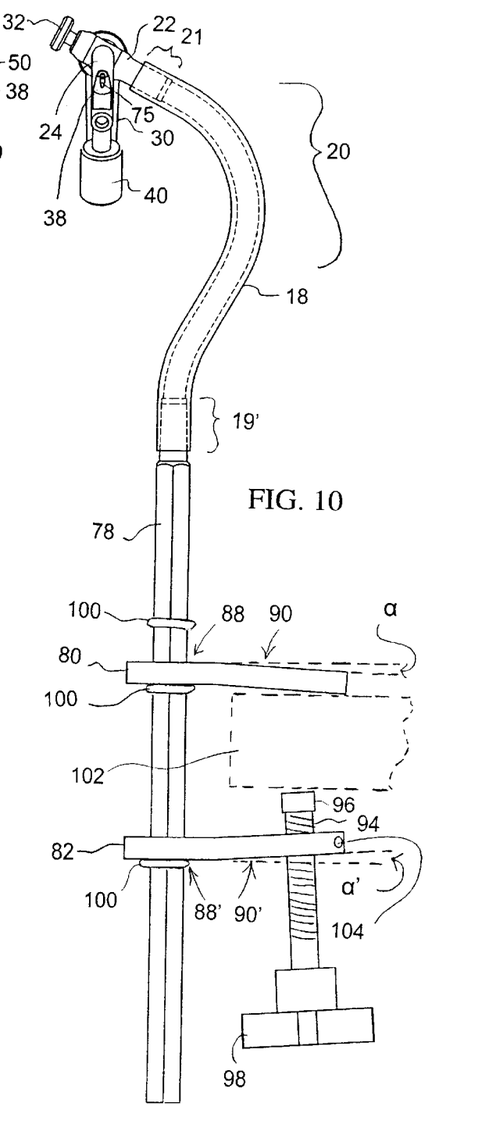
FIG. 10 is a side view of the embodiment of FIG. 8, taken in the direction of arrow 1 on FIG. 8.

Referring now to FIG. 8, a perspective view of an embodiment fly tying vise in accordance with the present invention, employing a clamping mechanism for mounting to a support, and to FIG. 9 and FIG. 10, side views of the embodiment of FIG. 8, taken in the direction of arrows 9 and 1 of FIG. 8, respectively, an alternative to base 12, in the form of a clamping mechanism 76, is shown. The mechanism includes an elongate shaft 78, suitably having a hex configuration, and first and second clamp plates 80, 82 slidingly receiving the shaft 78 through hex aperture portions 84 and 86 thereof. The apertures are slightly larger than the size of the hex shaft 78, to enable movement of the plates along the length of the shaft. Each clamp plate has a first portion 88 (88') and a second portion 90 (90'), portion 88 carrying the aperture portion and portion 90 defining a rectangular engaging surface. The surface of portion 90 is set at a slight angle α to the surface of portion 88 (a corresponding angle α' (which may or may not be the same as angle α, defines the relation of portion 88' and 90'). Second clamp plate 82 has a threaded aperture 92 defined through portion 88' thereof, and a correspondingly threaded shaft 94 is received therethrough. A cap 96 is provided on one end of shaft 94, and is free to rotate thereon, while a handle 98 is attached to the other end of the shaft. Apertures 104 (FIG. 10) can be provided in plate 82, suitably two such apertures being positioned on opposing ends of one side of the plate. Plural o-ring members 100 (not shown in FIG. 9), suitably being elastomeric in nature, are optionally provided around the hex shaft 78, and may be positioned along the shaft as desired, above or below the clamp plates.

One end of the shaft 78 has a taper defined thereon at region 19', which corresponds to the taper provided on base post 14 (FIG. 3). Accordingly, the interior taper of the curved mounting post 18 can be frictionally engaged with the tapered portion of the shaft 78, to enable mounting of the vise to the shaft 78.

In use, the clamping mechanism allows the vise to be attached to a variety of structures having widely varied thickness. For example, in FIG. 10, the clamping mechanism is attached to a table 102 (illustrated in phantom). The clamp plates 80 and 82 are moved to be relatively close together, but farther apart than the thickness of table 102. O-rings 100 may be adjusted up or down the length of the shaft 78 to act as movement limits, so the clamp plates do not slide too far away from the desired position. Shaft 94 is rotated and travels upwardly by reason of the threaded engagement with plate 82, whereupon cap 96 (which protects the bottom of table 102 from damage) contacts the table bottom. Shaft 94 is free to turn while cap 96 remains stationary. Both plates 80 and 82 are then wedged slightly, by reason of the angled relation between portions 88 and 90, so that the plates securely engage the shaft 78 at their hex apertures against vertical axis movement along the shaft.

Apertures 104 can receive a mounting shaft therein, for supporting accessories, such as a catch basket for holding waste materials from the tying process, in relation to the vise. Since the clamp plates can be moved anywhere along the length of the shaft 78, the vise can be clamped to relatively thin tables (or the like), as well as very thick ones, up to nearly a thickness equal to the extent of the length of the hex portion of shaft 78.

While shaft 78 is a hex shape in the preferred embodiment, any other shape may be employed to provide a keying between the plates and the shaft or to otherwise prevent rotation of the clamp plates about the shaft.

Accordingly an improved fly tying vise is provided in accordance with the present invention. Hooks are securely held by the vise, without requiring excessive effort to clamp the vise. A three point engagement with the hook is furnished by the centrally hollow anvil and the extensible eye bolt received therein, with a hook engaging opening in the eyebolt. A curved portion provided in the mounting post gives room for the hand of the fly tier, keeping the vertical support stem of the vise out of the way. The design enables a wide range of hook sizes to be secured, while still allowing the shaft or other portion of the hook to be positioned on the rotational centerline of the vise. The tapered engagement of portions of the vise allows easy assembly, disassembly and compact storage of the vise when not in use. The vise configuration also enables use by right or left handed tiers. The vise can be supported with a free standing base mount unit or with a clamping mount unit, enabling use in a variety of locations.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A vise for securing a workpiece comprising:
    an anvil having a through aperture defined therein;
    an eye bolt passing through said aperture and adapted for extending inwardly and outwardly of said aperture,
    wherein the workpiece is engaged by said eye bolt and said anvil; and
    a support member for positioning said anvil relative to a base, said support arm having a longitudinal axis,
    wherein said anvil is translatable relative to said longitudinal axis of said support arm.

2. A vise according to claim 1 wherein said eye bolt is slidingly received within the aperture.

3. A vise according to claim 1 further comprising means for adjusting said anvil and eye bolt relative one another to alter the degree of engagement with the workpiece.

4. A vise according to claim 3 wherein said adjusting means comprises a threaded portion on said eye bolt and an adjustment nut, whereby operation of said adjustment nut moves said eye bolt inwardly or outwardly of the aperture with respect to said anvil.

5. A vise according to claim 1 wherein said eye bolt comprises an elongate slot therein for receiving a portion of the workpiece therethrough.

6. A vise according to claim 5 wherein said eye bolt is slidingly translatable through said aperture for raising and lowering said elongate slot relative to a surface of said anvil.

7. A vise according to claim 1 wherein said aperture defined in said anvil is centrally defined therein.

8. A vise according to claim 1, wherein said support member comprises a tapered region for removably engaging with a corresponding tapered region defined in the base.

9. A vise according to claim 1, wherein said support member comprises a tapered region and said anvil comprises a corresponding tapered region for removably engaging therewith.

10. A vise according to claim 1, wherein said support member comprises a shaft member and first and second clamp members, said shaft member including a keying profile thereon and said first and second clamp members including apertures therein for receiving said shaft member therethrough in a keyed relation.

11. A vise according to claim 10, wherein at least one of said first and second clamp members comprise an angled portion defining an angle relative to another portion thereof.

12. A vise according to claim 10, wherein said shaft member has a taper defined at an end thereof, and said anvil includes a support member having a corresponding taper defined therein for removably mounting said anvil to said shaft.

13. A vise according to claim 10, wherein said first and second clamp members are adapted to engage with said shaft member along a length thereof, for enabling clamping to a wide size range of work sites.

14. A fly tying vise for securing a fishing hook comprising:
    an anvil defining a first and a second engagement point for engaging the fishing hook;
    an engager member defining a third engagement point for engaging the fishing hook, wherein the fishing hook is engaged at three points by translation of said engager member and said anvil relative one another; and
    a support member for positioning said anvil relative to a base, said support arm having a longitudinal axis,
    wherein said anvil is translatable relative to said longitudinal axis of said support arm.

15. A fly tying vise according to claim 14 further comprising a tightening control for tightening and loosening engagement of the fishing hook.

16. A fly tying vise according to claim 14 wherein said engager member is elongate.

17. A fly tying vise according to claim 14 wherein said engager member comprises a single piece elongate member.

18. A fly tying vise according to claim 14 further comprising a clamping adjustment control including a threaded member therein, wherein said engager member comprises a complementary threaded portion thereon for engagement with said threaded member.

19. A vise comprising:
    a gripping member for engaging a workpiece;
    a support post for holding said gripping member at a height, wherein said support post comprises a curved portion concave towards a work direction for providing access space for a user's hand near said support post and said gripping member in operation,
    wherein a portion of said support post has a longitudinal axis and wherein said anvil is translatable relative to said longitudinal axis of said portion of said support post.

20. A vise according to claim 19 wherein said gripping member comprises:
    an anvil having an aperture centrally defined therein; and
    an eye bolt passing through said aperture, wherein the workpiece is engaged by said eye bolt and said anvil.

21. A vise according to claim 20 wherein said eye bolt is slidingly received within the aperture.

22. A vise according to claim 20 further comprising means for adjusting said anvil and eye bolt relative one another to alter the degree of engagement with the workpiece.

23. A vise according to claim 22 wherein said adjusting means comprises a threaded portion on said eye bolt and an adjustment nut, whereby operation of said adjustment nut moves said eye bolt inwardly or outwardly of the aperture with respect to said anvil.

24. A vise according to claim 20 wherein said eye bolt comprises an elongate slot therein for receiving a portion of the workpiece therethrough.

25. A vise according to claim 24 wherein said eye bolt is slidingly translatable through said aperture for raising and lowering said elongate slot relative to a surface of said anvil.

26. A vise according to claim 20 wherein said aperture defined in said anvil is centrally defined therein.

27. A vise according to claim 19 wherein said gripping member comprises:
    an anvil defining a first and a second engagement point for engaging the workpiece; and an engager member defining a third engagement point for engaging the workpiece, wherein the workpiece is engaged at three points by translation of said engager member and said anvil relative one another.

28. A vise according to claim 27 further comprising a tightening control for tightening and loosening engagement of the workpiece.

29. A vise according to claim 27 wherein said engager member is elongate.

30. A vise according to claim 27 wherein said engager member comprises a single piece elongate member.

31. A vise according to claim 27 further comprising a clamping adjustment control including a threaded member therein, wherein said engager member comprises a complementary threaded portion thereon for engagement with said threaded member.

32. A vise according to claim 19 wherein said support post includes a tapered engagement portion for removably mating with said gripping member.

* * * * *